Figure 1:
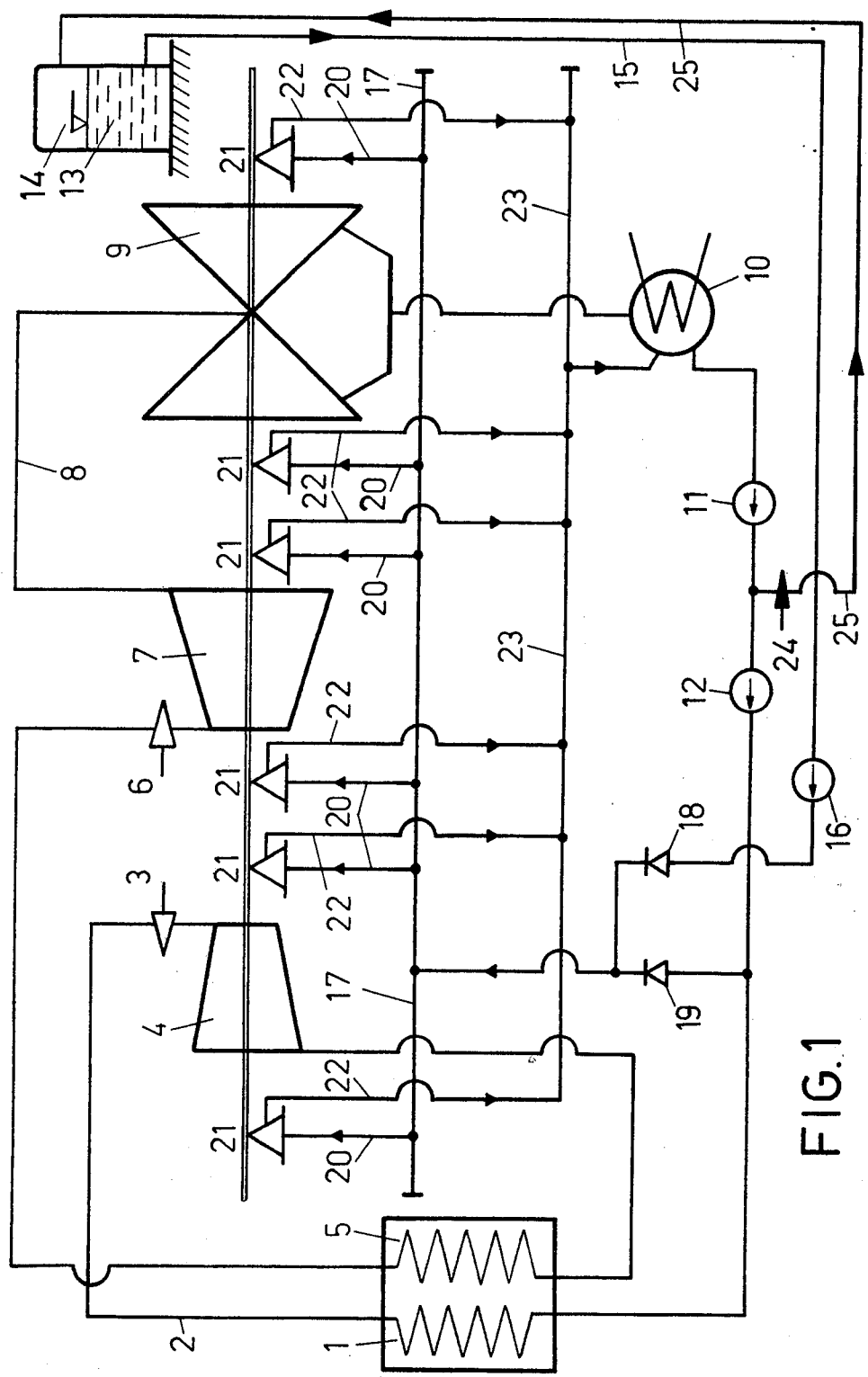

United States Patent [19]

Hohn

[11] 4,044,561

[45] Aug. 30, 1977

[54] STEAM TURBINE HAVING BEARING STRUCTURES LUBRICATED WITH STEAM CONDENSATE IN RECIRCULATING SYSTEM

[75] Inventor: Alfred Hohn, Kirchdorf, Switzerland

[73] Assignee: BBC Brown Boveri & Company Limited, Baden, Switzerland

[21] Appl. No.: 604,061

[22] Filed: Aug. 11, 1975

[30] Foreign Application Priority Data

Aug. 6, 1974  Switzerland .................. 11238/74

[51] Int. Cl.² ................... F01B 31/00; F01K 21/00
[52] U.S. Cl. .......................... 60/657; 60/646; 277/15; 415/113
[58] Field of Search ............ 60/646, 657; 277/15; 415/110-115

[56] References Cited

U.S. PATENT DOCUMENTS

| | | | |
|---|---|---|---|
| 1,004,822 | 10/1911 | Scheurmann | 415/112 |
| 2,259,361 | 10/1941 | Vorkauf | 415/112 |
| 2,463,898 | 3/1949 | Moore | 415/112 |
| 3,831,381 | 8/1974 | Swearingen | 60/657 |

*Primary Examiner*—Allen M. Ostrager
*Attorney, Agent, or Firm*—Pierce, Scheffler & Parker

[57] ABSTRACT

A steam turbine construction wherein the turbine rotor shafting is mounted in bearing means located in the end walls of the turbine housing and wherein the bearings are lubricated with water condensed from the working steam supplied to the turbine. The lubricant flows in a re-circulating system tapped from the condensate-return line leading back to the boiler from the condenser after the turbine has been started and is supplying power, and an auxiliary supply of lubricant water is taken from a reserve gravity flow tank to supply water to the bearings during the starting and stopping runs of the turbine.

2 Claims, 2 Drawing Figures

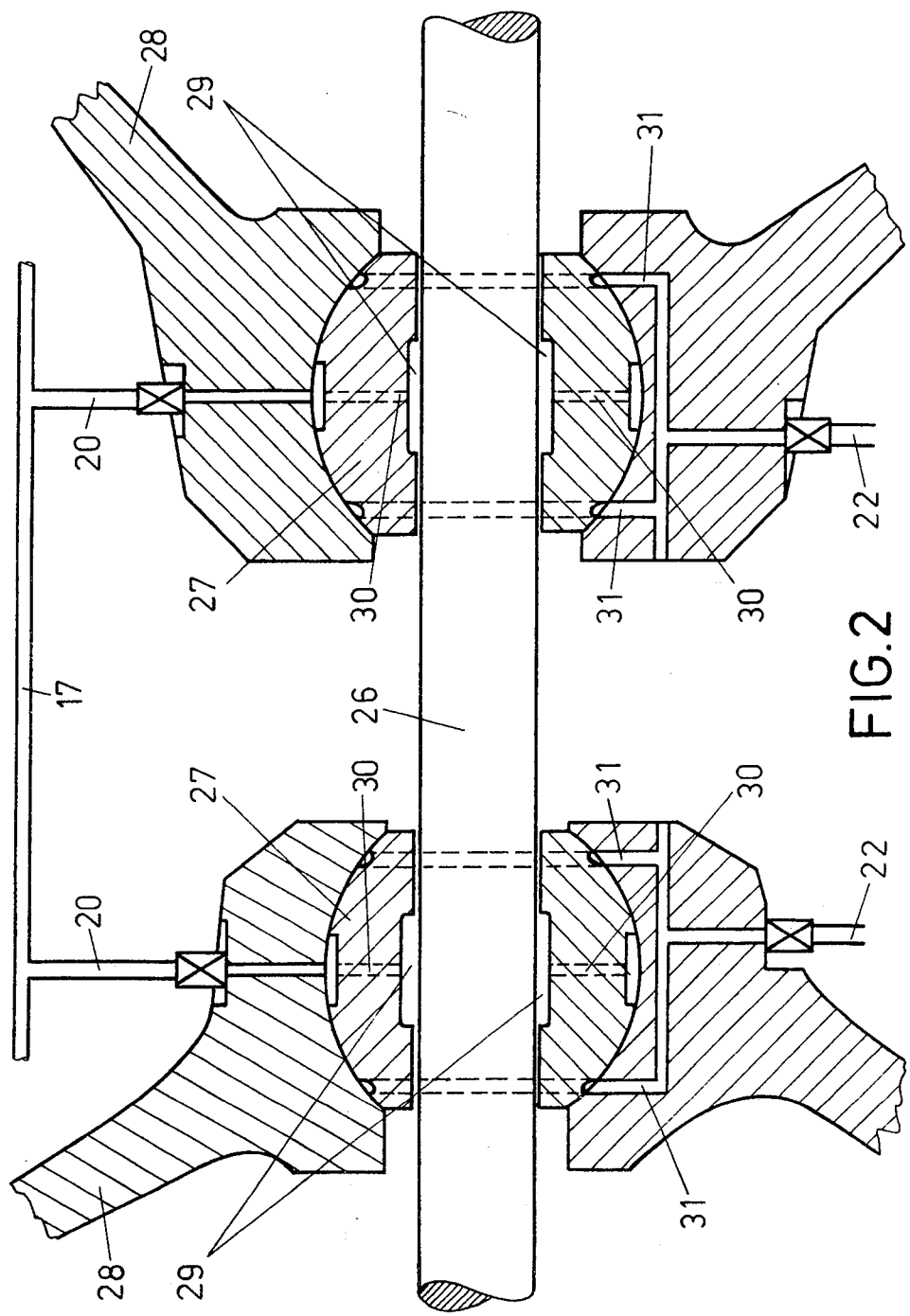

STEAM TURBINE HAVING BEARING STRUCTURES LUBRICATED WITH STEAM CONDENSATE IN RECIRCULATING SYSTEM

The invention concerns a bearing structure for steam turbines without stuffing boxes, equipped with a separate circulating lubrication system.

Turbomachines, and especially steam turbine machine groups, are mounted in hydrodynamically or hydrostatically lubricated journal bearings, normally with oil being used as the lubricant. For this lubrication there is used a separate circulating system, formed by an oil storage tank, a pressure pump for the supply of lubricating oil, one or more oil coolers, oil filters, appropriate pipe systems, the journal bearings and the bearing blocks. The bearing block supporting the bearing is usually placed at a base bar, but in certain cases is also installed directly on the turbine housing. However, in any event it is connected into the circulating lubricant system which is unrelated to the turbine driving medium, in other words supplied with lubricating oil, thus requiring a substantial axial overall length, comprising approximately 15% of the entire length of the machine. There are also required sealing units, for example stuffing boxes or labyrinth seals, arranged between the power chamber and the mounting proper, in order to seal the turbine power chamber against the outside atmosphere.

It is the aim of the invention to provide a mounting which does not require the use of special stuffing boxes and where there is no need for special bearing blocks to support the shaft mountings.

The invention solves this problem by arranging within the turbine housing mounting units with pressure pockets and feed-in apertures which are connected to the lubrication ducts, where the lubricant is a portion of the condensed working medium of the steam turbine.

Since water is being used as the lubricant, there is no need for any additional installations as would be necessary in case of utilization of lubricating oils which require the installation of separate circulatory systems. A lubrication by means of water, being one portion of the working medium of the steam turbine, is relatively simple since steam power plants always have water under pressure available in sufficient quantities from the boiler-supplying pump.

In a further development of the invention the mounting units are designed as stuffing boxes, their outer surfaces shaped in the form of a part-spherical dome.

The design of the mounting units as stuffing boxes eliminates the bearing-friction losses and makes unnecessary the use of a special seal of the power chamber against the outer atmosphere. The arrangement of pressure pockets with feed-in apertures and lubricating ducts within the mounting units makes possible a constant and uniform lubrication of the mounting points, a feature which is of particular importance during the beginning and the completion of the turbine run. The design of the outer surface of the mounting units in the form of a part-spherical dome makes it possible to adjust the individual bearings in a simple manner.

It will be further advantageous to arrange, for the purpose of providing lubrication during the beginning and the ending of the turbine run, a gravity tank for lubricants and to design this circulating lubrication in the form of an auxiliary system.

The arrangement of a gravity tank for lubricants, which is able to deliver water under pressure into the lubricating system by means of an auxiliary pump will insure a sufficient lubrication even during the starting-up period of the turbine, that is before a proper pressure is built up within the working cycle.

The accompanying drawings show in diagrammatic form one practical example of the invention wherein:

FIG. 1 depicts a main system for the steam circulation and a circulating system for lubricating water under pressure in the case of a steam turbine, and FIG. 2 shows in cross-section a bearing structure of a steam turbine without stuffing boxes.

FIG. 1 shows a boiler 1 of a steam turbine, for example a reaction chamber, from which there is conducted high-pressure steam into a high-pressure turbine 4 by way of a feed line 2 and an intake valve 3. From the high-pressure turbine 4 the steam enters a medium-pressure turbine 7 by way of an intermediate superheater 5 and an intercept valve 6. The medium-pressure turbine 7 is connected to a low-pressure cylinder 9 by way of a connecting line 8. From there the steam is returned to the boiler 1 by way of a condenser 10, a booster pump 11 and a boiler-feed pump 12. A gravity tank 13 mounted higher than the turbine and equipped with a level-control 14, contains a supply of reserve water which delivers water under pressure to a main lubrication line 17 by way of reserve water line 15 and a reserve pump 16. A non-return check valve 18 is placed between the reserve pump 16 and the main lubrication line 17.

The water under pressure reaches the individual bearing points 21 from the main lubrication line 17 by way of the branched off lubrication lines 20, and returns from these points to the condenser 10 by way of lubricant-return lines 22 and a drain line 23 connected to condenser 10. Between the booster pump 11 and the boiler-feed pump 12 there is arranged a branch line carrying a valve 24, this valve being connected with a feed line 25 which allows the replenishing of the gravity tank 13 with reserve water by opening the valve 24.

FIG. 2 shows a turbine rotor shaft 26, its bearings 27 arranged within the end-walls 28 of a turbine housing. The surfaces of the bearings 27 are shaped in the form of a spheric dome which adjoin a complementary configured surface provided in the end wall and are fed with water under pressure by way of the main lubrication line 17 and the branch lubrication lines 20. The spheric surface of the bearings allows their specific, individual adjustment. The water is fed in at the center of the spheric dome and leaves the bearing surface through laterally placed channels 31 manifolded into return line 22 and thus the adjoining surfaces of the bearing and end wall together with the water flowing therebetween also function as stuffing boxes in preventing any loss of steam from the housing. At the contact surface of the bearings 27 adjacent the pass-through point of shaft 26 there are provided pressure pockets 29 which are in communication with the branch lubrication feed lines 20. These pressure pockets 29 are uniformly circumferentially spaced over the inner bearing perimeter, with the result that a bearing, thusly equipped, will act as an hydrostatic journal bearing during the starting phase of the turbine. Within the bearings 27 there are further arranged feed-in channels 30 for the water from lines 20 to pockets 29, making it possible to supply the lower pressure pockets 29 with water at a higher lubricant pressure, causing a lifting of the shaft 26.

As soon as the shaft 26 begins to rotate due to the drive by the expanding steam, a hydrodynamic lubricating-film-pressure component will be generated. Therefore, the bearings so equipped will operate as hybrid bearings, i.e. during the starting and the ending run of the turbine as hydrostatic bearings and during the normal power output of the turbine as hydrodynamic bearings.

During the starting or the ending run of the turbine, water under pressure, being utilized as lubricant, will flow through the reserve water line 15 into the main lubrication line 17 by way of the reserve pump 16 and the non-return check valve 18. From the line 17 the water will reach the individual bearing points 21 i.e. the bearing components 27 by way of the branched off lubrication lines 20. This water will flow then from the bearing points 21 through the lubricant-return lines 22 into the drain line 23, and return from there to the condenser 10.

When the turbine has reached a certain power, the reserve pump 16 is turned off, and the bearing points 21 are then supplied entirely with water to be used as the lubricant under pressure from the boiler return line between the boiler-supply pump 12 and the boiler 1. Between this part of the boiler feed water return line and the main lubrication line 17 there is arranged a non-return check valve 19 to control the flow of the water under pressure, thus preventing the water which is utilized for lubrication purposes from leaving the main lubrication line 17 and flowing backwards into the line leading back into the boiler 1.

I claim:

1. A steam turbine comprising a housing within which the turbine rotor is mounted and includes shafting extending through an end wall structure of the housing, bearing means mounted within said end wall structure and which support the shafting, said bearing means having a spheric dome-shaped outer surface adjoining a complementary configured surface provided in said end wall and including pressure pockets facing said shafting, feed-in channels to said adjoining spheric surfaces and to said pressure pockets from a lubrication line, and a lubrication system for supplying said lubricating line with water condensed from the working steam supplied to the turbine, said adjoining surfaces of said bearing means and end wall providing adjustment of said bearing means, and the flow of water between said adjoining surfaces of said bearing means and end wall serving as a seal to prevent loss of steam from said housing.

2. A steam turbine comprising a housing within which the turbine rotor is mounted and includes shafting extending through an end wall structure of the housing, bearing means mounted within said end wall structure and which support the shafting, said bearing means including pressure pockets facing said shafting, feeding channels to said pressure pockets from a lubrication line, and a lubrication system for supplying said lubricating line with water, said lubrication system being connected to and receiving condensed water from a system which returns steam condensate from a condenser unit to a boiler unit for reconversion into steam and recirculation through said turbine, a gravity tank for storing a supply of the condensed water and means for feeding said bearing means from said gravity tank during the starting and stopping runs of said turbine.

* * * * *